United States Patent [19]

Lin

[11] Patent Number: 4,871,825

[45] Date of Patent: Oct. 3, 1989

[54] BINDER COMPOSED OF A GRAFT COPOLYMER OF HIGH MOLECULAR WEIGHT LIGNIN MATERIAL AND AN ACRYLIC MONOMER

[75] Inventor: Stephen Y. Lin, Wausau, Wis.

[73] Assignee: Reed Lignin Inc., Rothschild, Wis.

[21] Appl. No.: 114,623

[22] Filed: Oct. 28, 1987

[51] Int. Cl.[4] .............................................. B01F 17/52
[52] U.S. Cl. ..................................................... 527/400
[58] Field of Search ....................... 527/400; 525/54.2; 530/500, 507

[56] References Cited

U.S. PATENT DOCUMENTS

| | | | |
|---|---|---|---|
| 4,001,202 | 1/1977 | Dilling et al. | 530/502 |
| 4,105,606 | 8/1978 | Forss et al. | 156/335 |
| 4,276,077 | 6/1981 | Zaslavsky et al. | 530/500 |
| 4,332,589 | 6/1982 | Lin | 8/557 |
| 4,374,738 | 2/1983 | Kelley | 524/445 |

FOREIGN PATENT DOCUMENTS

| | | | |
|---|---|---|---|
| 62-121629 | 6/1987 | Japan . | |
| 2121629 | 7/1987 | Japan | 527/400 |
| 1168515 | 7/1985 | U.S.S.R. . | |

OTHER PUBLICATIONS

"The Chemistry of Lignin", 1967, Pearl, pp. 250-258, Marcel Dekker, Inc. N.Y.C.
"Chemical Heterogeneity of Technical Lignins-Its Significance in Lignin Utilization", 1981, Lin and Detroit.
"Estimation of Polymolecularity in Lignin Sulfonate Polymers from Diffusion Measurements", 1959, Moacanin et al, pp. 2054-2060.
"Study on the Graft Copolymerization of Lignosulfonate and Acrylic Monomers" by Chen et al, published in *Journal of Applied Polymer Science*, vol. 25, pp. 2211-2220 (1980).

*Primary Examiner*—John Kight
*Assistant Examiner*—Nathan M. Nutter
*Attorney, Agent, or Firm*—Andrus, Sceales, Starke & Sawall

[57] ABSTRACT

A binder composed of a graft copolymer of high molecular weight sulfonated lignin material and an acrylic compound. At least 35% by weight of the lignin material has a molecular weight in excess of 5,000 daltons. The binder is produced by reacting the high molecular weight sulfonated lignin material with 0.0125 to 0.5 parts, per part of lignin material, of acrylic acid, methyacrylic acid or acrylonitrile. A process for making the binder is also disclosed.

22 Claims, 2 Drawing Sheets

BINDER COMPOSED OF A GRAFT COPOLYMER OF HIGH MOLECULAR WEIGHT LIGNIN MATERIAL AND AN ACRYLIC MONOMER

BACKGROUND OF THE INVENTION

This invention concerns a sulfonated lignin binder. More particularly, it is related to a graft copolymer of high molecular weight sulfonated lignin material and an acrylic monomer.

As used herein, the term "lignin" has its normal connotation, and refers to the substance which is typically recovered from alkali pulping black liquors, such as are produced in the kraft, soda and other well-known alkali pulping operations. The term "sulfonated lignin", as used in this specification, refers to the product which in this specification, refers to the product which is obtained by the introduction of sulfonic acid groups into the lignin molecule, as may be accomplished by reaction of the lignin with sulfite or bisulfite compounds. As used herein, the term "lignosulfonate" refers to the reaction product of lignin which is inherently obtained during the sulfite pulping of wood, straw, corn stalks, bagasse and the like, and is a principal constituent of the spent sulfite liquor which is derived from that process. Finally, the phrase "sulfonated lignin material" encompasses both sulfonated lignin and lignosulfonate herein above described.

There are several prior art disclosures on copolymers of lignosulfonate and acrylic compounds. For example, U.S. Pat. No. 4,374,738 discloses a water-based drilling mud composition which comprises an aqueous disperson of a clay material and a graft copolymer of lignosulfonate and an acrylic compound including acrylic acid, acrylonitrile and acrylamide. In U.S. Pat. No. 4,276,077, a method is revealed for improving a soil structure by stabilization of aggregates obtained from crude lignosulfonate and a monomer selected from among acrylonitrile, vinyl acetate, acrylamide or combinations thereof. Sovient Union Patent No. 1,168,515 (July 23, 1985) teaches the use of a copolymer of lignosulfonate and (meth)acrylic acid in inhibiting the deposit of inorganic salts. A study on graft copolymerization of lignosulfonate acrylic compounds was reported in the *Journal of Applied Polymer Science*, Vol. 25 : 2211–2220 (1980). These cited prior art, however, failed to recognize the use of a copolymer of lignosulfonate and an acrylic compound as a binder, and further failed to disclose or recognize a critical parameter (high molecular weight of sulfonated lignin materials) necessary for making an effective lignin binder.

Crude lignosulfonates as employed in the prior art generally do not have high enough molecular weights for making the effective binder of the present invention. The % by weight of said crude lignosulfonates in excess of 5,000 daltons are approximately:
Softwood Lignosulfonates—30%
Hardwood Lignosulfonates 15%

A major object of this invention is to provide an effective lignin binder. Another object of this invention is to provide a binder from sulfonated lignin materials.

An additional object of this invention is to provide a simple process for the production of the sulfonated lignin binder.

Other objects and features of this invention may be evident in the following detailed disclosure.

SUMMARY OF THE INVENTION

These and other objects of the invention are accomplished by a graft copolymer of high molecular weight sulfonated lignin material and an acrylic monomer. At least about 35% by weight, preferably at least about 45% by weight, of said lignin material has a molecular weight in excess of 5,000 daltons. The binder of the invention is produced by reacting the high molecular weight sulfonated lignin material with 0.0125 to 0.5 parts, per part of lignin material, of acrylic acid, methacrylic acid, or acrylonitrile.

A suitable process for making the binder of the invention comprises forming an aqueous solution of the high molecular weight lignin material at a solids concentration of 20% to 45%, preferably 30% to 35%, mixing with an acrylic monomer in a lignin-monomer ratio of about 100:1.25 to about 100:50, and initiating copolymerization of the lignin material and acrylic monomer. A catalytic amount of ferrous sulfate (less than 1% on the weight of sulfonated lignin material) may also be utilized in the reaction mixture, and the pH of the mixture should be between 2.5 and 4.5. Copolymerization may be initiated by reacting with 1.25% to 5% hydrogen peroxide. Alternatively, persulfate may be employed in place of hydrogen peroxide. If acrylonitrile is utilized, subsequent hydrolysis with a caustic such as sodium hydroxide or potassium hydroxide is necessary to hydrolyze the nitrile group to a carboxylic group.

DETAILED DESCRIPTION OF THE INVENTION

The suitability of a sulfonated lignin material for use in the manufacture of the binder of the present invention is determined by its molecular weight. For the purpose of this invention, analytical gel permeation chromatography (GPC) is employed to measure the molecular weight distribution of lignin. The theory of GPC is described in numerous texts, e.g., *Gel Chromatography*, by H. Determann, Springer-Verlay, New York Inc., (1968). In essence, it is a technique whereby macromolecules of different size (or molecular weight) are separated in homogeneous gels, and eluted with a suitable solvent in the order of decreasing molecular weight. In this manner, using a commercial gel, for example, Sephadex G-100, available from Pharmacia, Inc. as the separating medium and 0.1 N NaCl solution as the solvent, GPC curves of sulfonated lignin samples are obtained, showing the quantity of lignin eluted at various lengths of time or elution volume. Calibration with lignin models of known molecular weights gives a linear relationship between elution volume and logarithm of molecular weight. The linear relationship is approximated by the following equation:

$$\log M.W. = 4.958 - 0.68 (v_i/v_o)$$

where $M.W.$ = molecular weight; $v_i$ = elution volume of a compound; and $v_o$ = exclusion volume of gel column.

Figure 1:
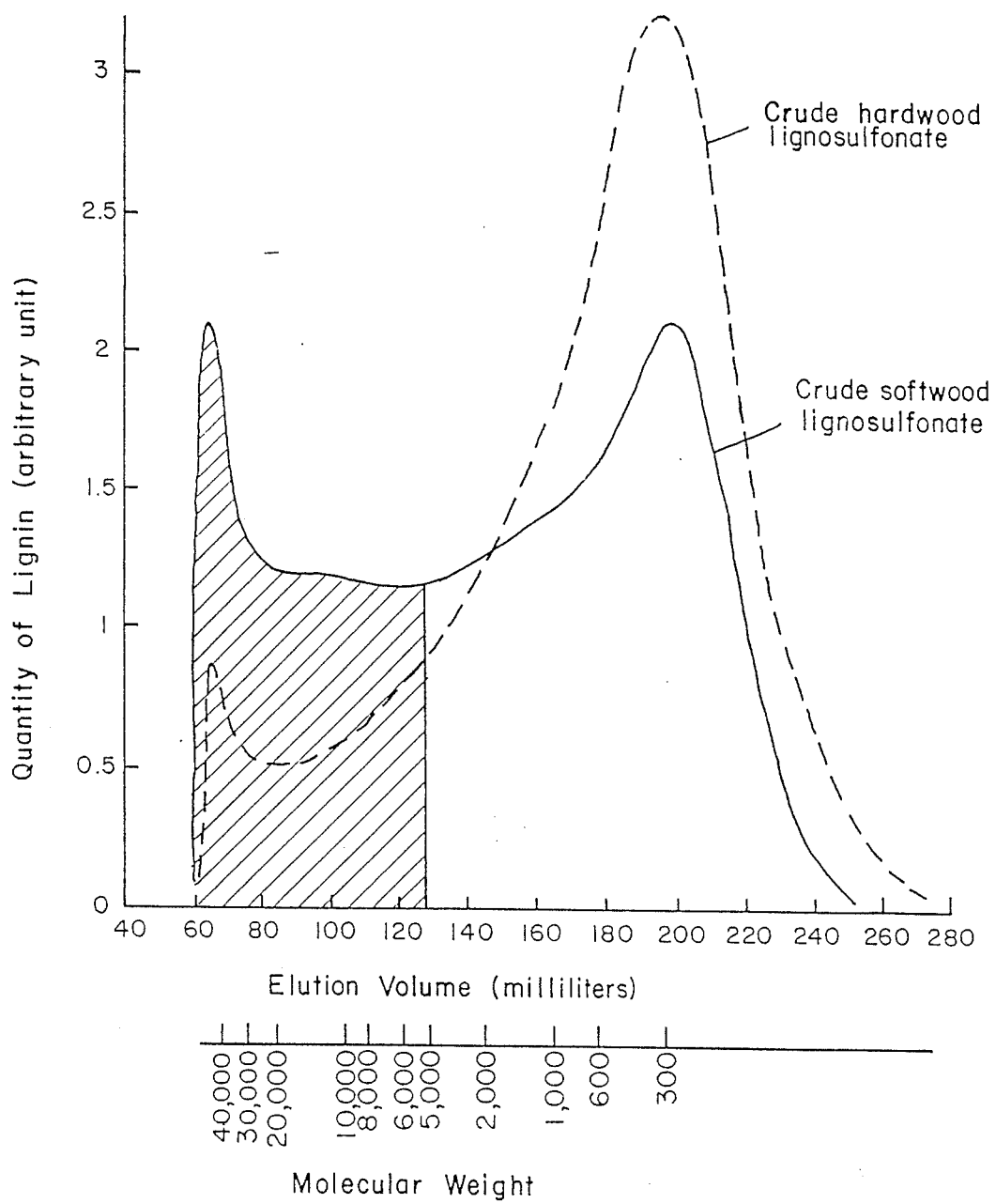
FIG. 1 shows the molecular weight distribution curves of two sulfonated lignin materials having from 15 to 30 weight percent of solids in excess of 5,000 daltons.

Thus, an elution curve may be expressed as quantity of lignin versus molecular weight and this is called a molecular weight distribution curve. FIG. 1 shows the normalized GPC molecular weight distribution curves of two typical crude lignosulfonates obtained from spent sulfite liquors.

In FIG. 1, the shaded area represents lignin materials having molecular weights in excess of 5,000 daltons.

Crude lignosulfonates as employed in the prior art generally do not have sufficiently high molecular weight for making the effective binder of this invention. The percentages by weight of said crude lignosulfonates in excess of 5,000 daltons are about 15% and 30% for hardwood and softwood lignosulfonates, respectively. The percentages by weight of crude sulfonated kraft lignins are similar to that of hardwood lignosulfonates.

According to especially specific embodiments of this invention for producing an effective lignin binder, the molecular weight distribution of sulfonated lignin material is such that at least 35%, preferably over 45%, by weight of said lignin material have molecular weights in excess of 5,000 daltons. The lignin binder of this invention is prepared by reacting said high molecular weight sulfonated lignin material with acrylic acid, methacrylic acid, or acrylonitrile (with subsequent hdyrolysis with a caustic such as NaOH or KOH) using a radical initiator such as persulfate or hydrogen peroxide/ferrous sulfate. It should be noted, however, that any method for initiating free radicals may be employed.

Lignosulfonates and sulfonated lignin with a molecular weight distribution required by the invention, may be obtained by any suitable methods of fractionation, for example, in a manner described in U.S. Pat. No. 3,825,526, or by any kind of precipitation, or by ultrafiltration. Also the sulfonated lignin material may be in the form of sodium, potassium, calcium, lithium or ammonium salts without hindering its performance as a binder.

The binder of the invention is obtained by reacting said high molecular weight sulfonated lignin material with 0.0125 to 0.5 parts, per part of lignin material, of acrylic acid, methacrylic acid or acrylonitrile to form a copolymer. A suitable method for producing the copolymer comprises, as a first step, forming an aqueous reaction mixture of a sulfonated lignin material and an acrylic monomer in a ligninmonomer ratio of 100:1.25 to 100:50. Below these ratios the binder is generally insufficiently effective, and above these ratios the reaction mixture gels. An amount of ferrous sulfate (0.12 to 1% by weight of lignin solids), as a catalyst, may be added to the lignin-monomer mixture and a pH of about 2.5 to 4.5 is established, if necessary, with sulfuric or phosphoric acid as well as other acids as desired.

The mixture is stirred with a mechanical stirrer for about one hour to dissolve the ferrous sulfate added. At the end of the stirring period, the required quantity of hydrogen peroxide (1.25 to 5% by weight) is added to the mixture. The copolymerization is complete soon after the amount of hydrogen peroxide has been added (about 15 minutes). No external heating needs to be applied to the reaction mixture. If acrylonitrile is utilized, subsequent hydrolysis of the reaction mixture with a caustic e.g. NaOH or KOH is necessary to convert the nitrile groups to carboxylic groups.

Solids concentrations of the reaction mixture are from 20% to 45%, depending on the molecular weight distribution of sulfonated lignin material employed. Generally speaking, the higher the molecular weight, the lower the solids concentration is maintained in order to prevent gelling of the reaction mixture.

The effectiveness of the invention binder cannot be duplicated with copolymers made by reacting crude lignosulfonates or other low molecular weight sulfonated lignin materials with excess quantities of acrylic or methacrylic acid, even though the copolymers may have a molecular weight that is higher than that of the invention binder.

Exemplary of the efficacy of the present invention are the following examples, wherein as parts and percentages specified are on a weight basis.

EXAMPLE ONE

Figure 2:
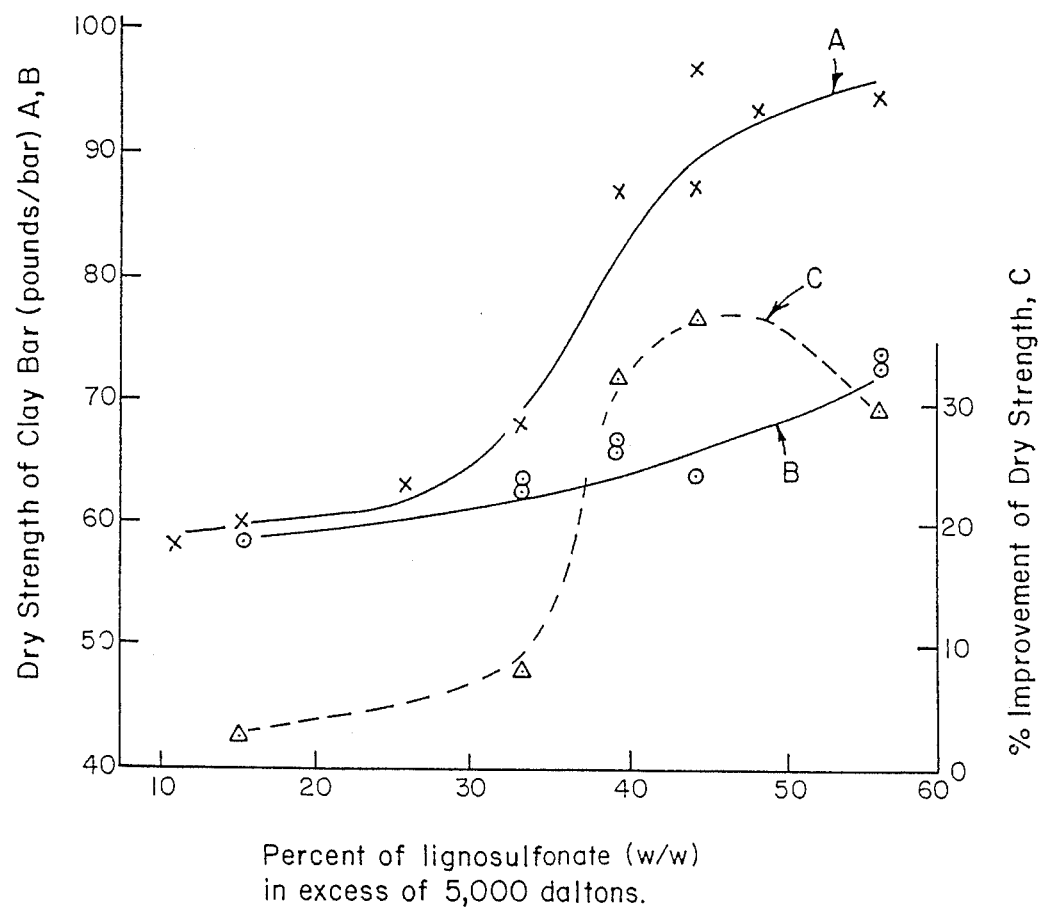
FIG. 2 shows the effect of molecular weight of sulfonated lignin material on the binding efficiency of a lignin binder made in accordance with the present invention.

This examples illustrates the importance of molecular weight distribution of lignosulfonate in affecting the binding property of a copolymer. Thus, a sodium salt of softwood lignosulfonate available from Reed Lignin Inc., Lignosol X, was ultrafiltered to obtain lignosulfonate fractions of different molecular weights. Each fraction (100 parts) was reacted with 10 parts of acrylic acid to make a copolymer. The copolymers and starting lignosulfonate fractions were evaluated for their binding properties according to the following procedure: A clay from an Illinois brick plant was blended with water and lignin additive in a Hobart mixer for five minutes. The water content of the clay and the dosage of lignin additive were kept at 26% and 0.4% on dry weight of clay, respectively. Using steel molds, clay bars of $\frac{3}{4}'' \times \frac{3}{4}''$ dimension were produced and dried in an oven at 105° C. overnight. The strength of the dry clay bars was measured on a Dillon Tester, and expressed as pounds/bar. FIG. 2 shows the effect of molecular weight distribution of lignosulfonte fraction on clay bar strength.

In FIG. 2, curve A represents a copolymer of lignosulfate and 10% by weight of acrylic acid, and curve B represents the starting lignosulfate. Curve C represents the percentage improvement in dry clay strength ($[(A-B/B)] \times 100$). It is clearly seen that a drastic increase in the strength (relative to the strength for unmodified lignosulfonate) occurs with the copolymer at the percentage of 35% by weight of the lignin material having molecular weight in excess of 5,000 daltons. The maximum strength increase occurs when about 45% by weight of the lignin material having molecular weight in excess of 5,000 daltons. Although high molecular weight unmodified lignosulfonate fraction improves the strength of dry clay bar, the improvement is significantly less than that attained with the invention binder.

EXAMPLE TWO

This example demonstrates that the superior binding property of the invention binder cannot be achieved with copolymer of crude lignosulfonate and acrylic acid even when an excess amount of the monomer is employed. Thus, 100 parts of the sodium salt of crude softwood lignosulfonate, Lignosol X, in Example One was reacted with from 10 to 150 parts of acrylic acid and the resultant copolymers evaluated as a binder for clay bar. Table 1 presents the viscosity data of the copolymers and the strength of dry clay bars. The maximum strength attained with the copolymers of crude softwood lignosulfonate was 70 pounds/bar at 40% loading of acrylic acid, compared to over 90 pounds/bar attained with the invention binder at only 10% loading of the monomer. With the crude lignosulfonate, a monomer loading exceeding 40% does not improve the strength.

TABLE 1

Viscosity of copolymers (at 30% solids) of crude softwood lignosulfonate and clay strength at various loadings of acrylic acid.

| % Acrylic Acid | Copolymer Viscosity (cps) | Strength of dry clay bar (pounds/bar) |
| --- | --- | --- |
| 0 | 100 | 59 |
| 10 | 140 | 64 |
| 20 | 230 | 66 |
| 40 | 310 | 70 |
| 60 | 530 | 65 |
| 80 | 720 | 59 |
| 100 | 870 | 57 |
| 150 | 1130 | 53 |

EXAMPLE THREE

This example illustrates the manufacture of the binder utilizing acrylonitrile. Sodium lignosulfonate of which 46% (w/w) had molecular weights exceeding 5,000 daltons was used in making lignin binder. Thus, 100 parts of said lignosulfonate solids were dissolved in water to make up a 30% solution. To the solution was added 5 parts of acrylonitrile and 0.25 parts of ferrous sulfate monohydrate under vigorous stirring. After one hour of stirring, the solution pH was adjusted to 3.5 with a concentrated sulfuric acid and copolymerization initiated by adding 2.5 parts of 50% hydrogen peroxide. After stirring for 2 hours the pH of the reaction mixture was adjusted to 12.5 with sodium hydroxide. Continuous stirring resulted in hydrolysis of the nitrile groups to carboxylic groups. Evaluation of the binder was made in accordance with Example Four and the results are found in Table 2 hereinafter.

EXAMPLE FOUR

Sodium lignosulfonate of which 46% (w/w) had molecular weights exceeding 5,000 daltons was used in making lignin binder. Thus, 500 parts of said lignosulfonate solids were dissolved in water to make up a 30% solution. To the solution was added 25 parts of acrylic acid and 1.25 parts of ferrous sulfate monohydrate under vigorous stirring. After one hour of stirring, the solution pH was adjusted to 3.5 with a concentrated sulfuric acid and copolymerization initiated by adding 12.5 parts of 50% hydrogen peroxide. The exothermic reaction caused the temperature to rise from 23° C. to 31° C. instantaneously. Upon cooling to the ambient temperature, the product solution was found to have 31% solids, pH 3.5 and Brookfield viscosity of 60 centipoises.

To evaluate the product as binder in the manufacture of brick, a sandy shale was used in an extrusion study. Thus, 7,500 grams of the shale was mixed in a Hobart mixer with water and the binder (at 0.25% on dry weight of clay) for five minutes. After conditioning in a plastic bag overnight, the mix was extruded through a laboratory extruder to produce clay bars. A vacuum of 20 inch Hg was maintained. Immediately after extrusion, the density of the green bar (Green density, Dg) was determined. Other measurements were subsequently performed on the clay bars after being dried at 105° C. for 24 hours. The pore volume of a dried clay bar was determined by filling the pores with kerosene. The shrinkage water ($t_s$) is the difference between the water of plasticity (T) and the pore water ($t_p$), which is equal to the volume dry shrinkage. The plastic weight ($W_p$) was obtained immediately after the clay bars were formed. The bars, after being dried in an oven at 105° C. for 24 hours, were cooled in a desiccator, weighed ($W_d$) and then submerged in kerosene for 24 hours. The soaked weights ($K_w$) in kerosene were then obtained. Before soaking, the dry strength of clay bars was determined on a Dillon Tester. Several parameters used in the brick industry were calculated as follows:

$$T = [(W_p - W_d) / W_d] \times 100$$

$$t_p = [(K_w - W_d) / 0.8 W_d] \times 100$$

$$t_s = T - t_p$$

$$a_p = t_p / T$$

where $a_p$ is plasticity coefficient.

TABLE 2

Property parameters of extruded clay containing invention binder and a crude lignosulfonate (Norlig A).

| Additive | T (%) | $t_p$ (%) | $t_s$ (%) | $a_p$ | $D_g$ | Dry Strength (pound/bar) |
| --- | --- | --- | --- | --- | --- | --- |
| Example Three | 18.0 | — | — | — | 2.19 | 279.0 |
| Example Three | 18.5 | — | — | — | 2.20 | 266.0 |
| Example Four | 14.5 | 13.9 | 0.6 | 0.041 | 2.28 | 224.7 |
| Example Four | 17.2 | 14.1 | 3.1 | 0.178 | 2.21 | 247.5 |
| Example Four | 19.3 | 15.4 | 3.9 | 0.204 | 2.15 | 211.4 |
| Norlig A | 15.0 | 15.0 | 0 | 0 | 2.17 | 181.9 |
| Norlig A | 17.8 | 16.2 | 1.5 | 0.086 | 2.15 | 178.3 |

Referring to Table 2, a comparison of the testing results of the invention binder and a crude lignosulfonate product, Norlig A, available from Reed Lignin Inc., commonly used in the brick industry indicates that at the same water content of clay, the new binder is more efficient plasticizer (higher plasticity coefficient) for clay and it gives about 35% higher dry strength than the crude lignosulfonate binder.

EXAMPLE FIVE

The lignin binder of Example Four was evaluated for its binding property in dry clay bars according to the molding procedure of Example One. The strength of dry clay bars increases with the dosage of the binder (as percent on weight of dry clay) as shown by the data of Table 3. In comparison with a crude lignosulfonate, Norlig A available from Reed Lignin Inc., and a polyacrylate, Good-rite K732 available from B.F. Goodrich Company, the invention binder is from 40% to 70% more effective depending on dosage used. The data also clearly shows that the unique binding property of the product of Example Four is the inherent characteristic of the copolymer of high molecular weight lignosulfonate and acrylic acid, and is not due to the separate entities of lignosulfonate and polyacrylate in the copolymer.

TABLE 3

Dosage effect of clay additive on strength of dry clay bars.

| Additive | Dosage (%) | Strength (pounds/bar) |
| --- | --- | --- |
| Example Four | 0.2 | 62 |
| Example Four | 0.4 | 85 |
| Example Four | 0.6 | 96 |
| Norlig A | 0.2 | 40 |
| Norlig A | 0.4 | 48 |
| Norlig A | 0.6 | 53 |

TABLE 3-continued

| Dosage effect of clay additive on strength of dry clay bars. | | |
|---|---|---|
| Additive | Dosage (%) | Strength (pounds/bar) |
| Polyacrylate | 0.2 | 44 |
| Polyacrylate | 0.4 | 55 |
| Polyacrylate | 0.6 | 56 |
| Control (no additive) | — | 32 |

EXAMPLE SIX

The utilities of the invention binder have been demonstrated also in other application areas. This example shows the advantages of the product of Example Four as a binder for cattle feeds. In pelletization of the feeds, the formation of fines is a major disadvantage in terms of dusting tendency and loss of the feeds encountered. To minimize the amount of fines generated, it is common to add such binders as crude lignosulfonate, cellulose gum and the like. A normal addition dosage of crude lignosulfonate is about 20 pounds per ton of feed. In a pelletizing experiment comparing the effectiveness of the binding properties, it was found that the invention binder (Example Four) is capable of reducing the same amount of fines at half the dosage as a commonly used lignosulfonate binder named Ameri-Bond commercially available from Reed Lignin Inc.

EXAMPLE SEVEN

This example illustrates the effectiveness of the binding properties of sodium as well as ammonium lignosulfonates when reacted with acrylic acid, forming a copolymer in accordance with the present invention, when utilized as an animal feed binder. Thus, 500 parts of sodium lignosulfonate (Lignosol X-50 available from Reed Lignin Inc.), designated as $NaLSO_3$, were dissolved in water (30% solids concentration) and reacted with 25 parts of acrylic acid at pH 3.5 using an initiator system of 0.25 parts of ferrous sulfate monohydrate and 1.25 parts of hydrogen peroxide. A second copolymer was also formed in accordance with the above procedure except utilizing ammonium lignosulfonate (Lignosol NST-150 available from Reed Lignin Inc.), designated as $NH_4LSO_3$, instead of sodium lignosulfonate. The resulting copolymers were dried and added onto feed at a rate equivalent to 5 lbs/ton. Unreacted lignosulfonates were included as controls. Treatments were mixed, pelleted and tested as follows.

Sixty-four kilograms of a base animal feed mix, namely Egg Maker Complete, a product of Land O'-Lakes AG Services, were passed through a sample splitter 4 successive times to yield 16 identical batches of 4 kg each. The above two copolymers were each separately applied to the feed in amounts equivalent to 0, 2, 3, 4, or 5 lbs per ton of feed. Feed was mixed for 1 minute in a V-blender equipped with a high-speed agitation bar. Treatments were replicated a minimum of three times and pelleted in a randomized order.

Pelleting was accomplished on a California Pellet Mill, Model CL Type 2, fitted with a 5/32" by 1-¼" die. Feed was conditioned with live steam (30 psi) to approximately 185° F. immediately before entering the press. Time in the conditioner was approximately 15 seconds. Treatments were run successively without interuption of process conditions between batches.

Pellets were immediately returned to room temperature by evaporative cooling under a stream of forced air. The first minute of each treatment was discarded to allow the mill to flush out all traces of the previous run. The remainder was retained and evaluated for pellet durability by ASAE Standard Method 269.1 modified to include two ¼" hex nuts in each chamber. Results are listed below.

| Effectiveness of $NaLSO_3$:AA and $NH_4LSO_3$:AA copolymers as binders | | |
|---|---|---|
| Treatment | Tumbler Fines, % | Reduction of Fines, % |
| No Binder | 20.5 | 0.0 |
| $NaLSO_3$ | 16.8 | 18.3 |
| $NH_4LSO_3$ | 16.3 | 20.5 |
| $NaLSO_3$:AA | 15.8 | 23.1 |
| $NH_4LSO_3$:AA | 15.4 | 24.9 |

EXAMPLE EIGHT

This example illustrates that a lignosulfonate:acrylic acid copolymer is more effective than a lignosulfonate:-starch blend which is currently being sold and used as a low inclusion animal feed binder. Sodium lignosulfonate was reacted with 5% acrylic acid as described in Example Seven. The resultant copolymer was tested versus Production Aid-Extra Strength, a low inclusion binder distributed by Cravac Industries. Treatments were mixed, pelleted, and tested as described in Example Seven. Results are listed below.

| Effectiveness of $NaLSO_3$:AA copolymer versus a commercial low inclusion binder | | | |
|---|---|---|---|
| Binder | Dosage, lbs/ton | Tumbler Fines, % | Reduction of Fines, % |
| No Binder | 0 | 20.8 | 0.0 |
| Production Aid ES | 5 | 18.8 | 9.5 |
| Production Aid ES | 10 | 16.6 | 20.1 |
| $NaLSO_3$:AA | 5 | 15.4 | 26.1 |
| $NaLSO_3$:AA | 10 | 13.2 | 36.5 |

Various modes of carrying out the invention are contemplated as being within the scope of the following claims particularly pointing out and distinctly claiming the subject matter which is regarded as the invention.

I claim:

1. As a composition of matter, a sulfonated lignin binder that is a copolymer of high molecular weight sulfonated lignin material and an acrylic monomer, at least about 35% by weight of said lignin material having molecular weights in excess of about 5,000 daltons as determined by gel permeation chromatography, said copolymer made by reacting said high molecular weight sulfonated lignin material with 0.0125 to 0.5 parts, per part of said lignin material, of said acrylic monomer.

2. The composition of claim 1 wherein said acrylic monomers are selected from the group consisting of acrylic acid, methacrylic acid, acrylonitrile, and mixtures thereof.

3. The composition of claim 1 wherein said high molecular weight sulfonated lignin material is selected from the group consisting of a lignosulfonate, a sulfonated lignin, and mixtures thereof.

4. The composition of claim 3 wherein at least about 45% by weight of said lignin material has a molecular weight in excess of about 5,000 daltons.

5. The composition of claim 1 wherein said high molecular weight sulfonated lignin material is an ultrafiltered lignosulfonate.

6. The composition of claim 1 wherein said sulfonated lignin material contains 4 to 8 percent organic sulfur.

7. The composition of claim 1 wherein said sulfonated lignin material is in the form of a sodium, potassium, calcium, lithium or ammonium salt.

8. In a method for production of a sulfonated lignin binder, the steps comprising:
  (1) providing a high molecular weight sulfonated lignin material, at least about 35% by weight of said material having molecular weights in excess of about 5,000 daltons as determined by gel permeation chromatography;
  (2) forming a 20% to 45% aqueous reaction mixture of said lignin material and an acrylic monomer in a lignin-monomer ratio of about 100:1.25 to about 100:50; and
  (3) initiating copolymerization of said sulfonated lignin material and said acrylic monomer.

9. The method of claim 8 wherein said step of providing a high molecular weight sulfonated lignin material is accomplished by fractionating spent sulfite liquor or sulfonated kraft lignin.

10. The method of claim 8 further including the step of adding a catalytic amount of a catalyst to said aqueous reaction mixture prior to initiating copolymerization.

11. The method of claim 10 wherein said catalyst is ferrous sulfate and said catalytic amount is about 0.12% to about 1.0% by weight of lignin solids.

12. The method of claim 8 further including the step of adjusting the pH of the aqueous reaction mixture to between about 2.5 and 4.5 prior to initiating copolymerization.

13. The method of claim 12 wherein said pH is adjusted to between about 3 and 3.5.

14. The method of claim 8 wherein said step of forming said aqueous reaction mixture comprises stirring said lignin material and acrylic monomer for about 0.5 to about 1.0 hours.

15. The method of claim 8 wherein said step of initiating copolymerization comprises adding hydrogen peroxide at about 1.25% to about 5.0% by weight of said lignin material.

16. The method of claim 8 wherein said acrylic monomer is selected from the group consisting of acrylic acid, methacrylic acid, acrylonitrile, and mixtures thereof.

17. The method of claim 8 wherein said lignin material is an ultrafiltered lignosulfonate, at least 45% by weight having molecular weights in excess of 5,000 daltons.

18. The method of claim 8 wherein said lignin material is a sulfonated lignin, at least 45% by weight having molecular weights in excess of 5,000 daltons.

19. The method of claim 8 wherein said acrylic monomer is acrylonitrile, and following the step of initiating copolymerization, said reaction mixture is hydrolyzed by adding a caustic thereto.

20. The method of claim 8 wherein said high molecular weight lignin material is obtained by fractionation.

21. The method of claim 8 wherein said high molecular weight lignin material is obtained by precipitation.

22. The method of claim 8 wherein said high molecular weight lignin material is obtained by ultrafiltration.

* * * * *